United States Patent Office 3,105,841
PROCESS AND INTERMEDIATES FOR THE MANUFACTURE OF 17-OXYGENATED 2α-METHYL-ANDROSTAN-3-ONES
Raymond E. Counsell, Skokie, Ill., assignor to G. D. Searle & Co., Chicago, Ill., a corporation of Delaware
No Drawing. Filed Sept. 8, 1960, Ser. No. 54,601
1 Claim. (Cl. 260—397.4)

The present invention is concerned with a novel process for the manufacture of 2α-methyl-steroids of the androstane series and to novel intermediates utilized therein. These intermediates are 2α-(tertiary-amino)-methyl-17β-hydroxy-5α-androstan-3-ones, optionally alkylated at the 17-position, and are represented by the structural formula

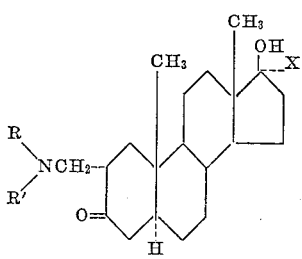

wherein the moiety

is the residue for a secondary amine selected from the group consisting of di-(lower alkyl)amines and heterocycloaliphatic amines. Lower alkyl radicals encompassed by R and R' are, typically, methyl, ethyl, propyl, butyl, pentyl, hexyl, and the branched-chain isomers thereof. The heterocycloaliphatic amines comprehended in the structural representation supra are exemplified by pyrrolidine, piperidine, and morpholine.

Starting materials suitable for the manufacture of the instant intermediates are substituted 5α-androstan 3-ones of the structural formula

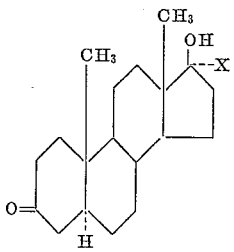

wherein X is hydrogen or a lower alkyl radical. The desired intermediates are obtained by treatment of the appropriate starting material with formaldehyde and a member of the aforementioned class of secondary amines, preferably in the form of its hydrochloride, followed by alkalization with an inorganic base. This reaction is shown below:

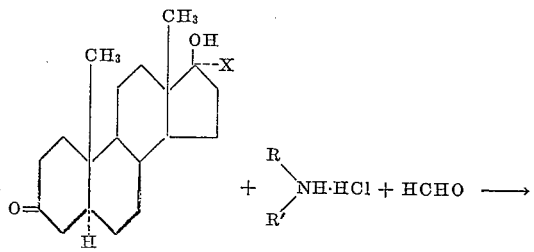

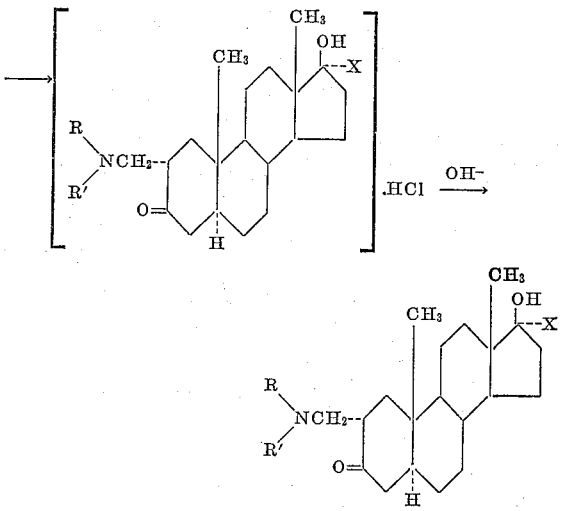

A typical illustration of this process is the preparation of 17β-hydroxy-17α-methyl-2α-(N,N-dimethylamino)methyl-5α-androstan-3-one by treatment of 17β-hydroxy-17α-methyl-5α-androstan-3-one with formaldehyde and dimethylamine hydrochloride, followed by neutralization with aqueous sodium carbonate to liberate the free base.

The novel process of this invention involves the hydrogenolysis of the aforementioned intermediates by treatment with gaseous hydrogen and a hydrogenation catalyst under suitable hydrogenation conditions to afford the corresponding 2α-methyl compounds. This process is illustrated below:

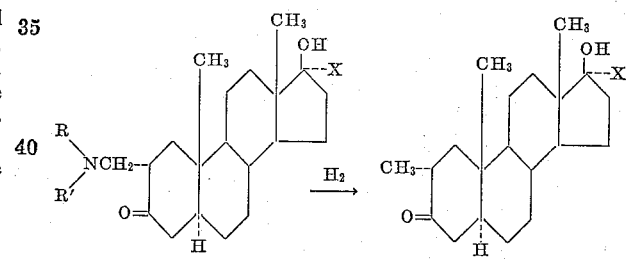

The resulting 2α-methyl compounds are known anabolic agents, as described by Ringold et al., J. Am. Chem. Soc. 81, 429 (1959). Appropriate catalysts are those which will effect the desired hydrogenolysis reaction without affecting other reactive centers of the molecule, for example the 3-keto group. Various supported palladium catalysts such as palladium-on-carbon and palladium-on-barium sulfate are particularly advantageous for this purpose. Organic solvents such as dioxane and ethanol can be used in this process, which is conveniently carried out at temperatures of 100–150° and pressures of 70–140 atmospheres. An example of the instant novel process is the treatment of 17β-hydroxy-17α-methyl-2α-(N,N-dimethylamino)methyl-5α-androstan-3-one in dioxane with hydrogen in the presence of 5% palladium-on-barium sulfate to afford 17β-hydroxy-2α,17α-dimethyl-5α-androstan-3-one.

The instant intermediates are useful also as a result of their valuable pharmacological properties. In particular, they are anti-estrogenic agents as evidenced by their ability to inhibit the sexual changes resulting from administration of estrogens.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.). Quantities of materials are expressed in parts by weight unless otherwise noted.

*Example 1*

To a solution of 15 parts of 17β-hydroxy-17α-methyl-5α-androstan-3-one and 25 parts of dimethylamine hydrochloride in 103 parts of ethanol is added 21 parts of 38% aqueous formaldehyde, and the resulting mixture is heated at reflux for about 2 hours, then stored at room temperature for about 15 hours. The reaction mixture is acidified by the addition of approximately 200 parts of dilute hydrochloric acid, then further diluted with 500 parts of water. This aqueous mixture is extracted with ether, then cooled by the addition of ice and made alkaline by means of aqueous sodium carbonate. The resulting precipitate is collected by filtration, washed with water, then recrystallized from ethyl acetate to afford needle-like crystals of 17β - hydroxy - 17α - methyl - 2α - (N,N - dimethylamino)methyl-5α-androstan-3-one, M.P. about 161–163°; $[\alpha]_D = -33°$ (chloroform). This substance displays infrared maxima at about 2.74, 3.38, 3.58, 5.83, 6.85, 7.22, and 10.72 microns.

The substitution of an equivalent quantity of diethylamine hydrochloride in the process of this example results in 2α-(N,N-diethylamino)methyl-17β-hydroxy-17α-methyl-5α-androstan-3-one.

*Example 2*

By substituting 14.4 parts of 17β-hydroxy-5α-androstan-3-one and otherwise proceeding according to the processes of Example 1, 17β-hydroxy-2α-(N,N-dimethylamino)-methyl-5α-androstan-3-one is obtained. This substance displays a double melting point at 154–157° and 225–245° and is further characterized by an optical rotation of —15° and infrared maxima at about 2.74, 3.38, 3.58, 5.82, 7.20, 9.60, and 9.85 microns.

*Example 3*

The substitution of 15.8 parts of 17α-ethyl-17β-hydroxy-5α-androstan-3-one in the process of Example 1 results in 17α-ethyl-17β-hydroxy-2α-(N,N-dimethylamino)methyl-5α-androstan-3one, which is obtained as an oil. A solution of this amine in ether is treated with isopropanolic hydrogen chloride, and the resulting precipitate is recrystallized from ethanol-acetone to afford the corresponding amine hydrochloride, M.P. about 203–205° (decomposition).

*Example 4*

By substituting 14.4 parts of 17β-hydroxy-5α-androstan-3-one and 33.6 parts of diethylamine hydrochloride in the process of Example 1, 2α-(N,N-diethylamino)methyl-17β-hydroxy-5α-androstan-3-one is obtained.

*Example 5*

To a solution of 3.63 parts of 17β-hydroxy-17α-methyl-2α-(N,N-dimethylamino)methyl-5α-androstan-3-one in 50 parts of dioxane is added 0.36 part of 5% palladium-on-barium sulfate catalyst, and the mixture is shaken in a hydrogen atmosphere at 130° and 75 atmospheres pressure until the theoretical quantity of hydrogen is absorbed. The catalyst is removed by filtration and washed on the filter with dioxane, and the filtrate is poured slowly into ice-cold water. The resulting precipitate is collected by filtration and chromatographed on alumina. Elution with 10% ethyl acetate in benzene results in 17β-hydroxy-2α,17α-dimethyl-5α-androstan-3-one, M.P. about 138–139°. This substance exhibits infrared maxima at about 2.74, 3.38, 5.82, 6.85, 7.23, and 10.72 microns.

What is claimed is:

A process for the manufacture of a compound of the structural formula

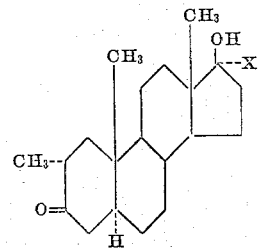

wherein X is a member of the class consisting of hydrogen and lower alkyl radicals, which comprises contacting a compound of the structural formula

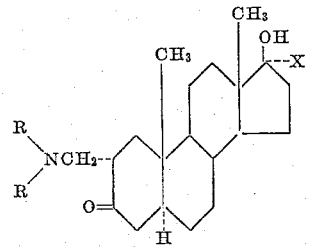

wherein R is a lower alkyl radical, with hydrogen in the presence of a suitable hydrogenation catalyst.

References Cited in the file of this patent

Patton: Chem. & Industry, July 18, 1959, page 923.